J. H. DENNEDY.
MEANS FOR CONTROLLING THE OPERATION OF AIR AND GAS COMPRESSORS.
APPLICATION FILED MAY 23, 1912.

1,152,400. Patented Sept. 7, 1915.

WITNESSES:
Richard Alspas.
Selene McDonald

INVENTOR
James H. Dennedy
BY
Charles E. Wisner
ATTORNEY.

UNITED STATES PATENT OFFICE.

JAMES H. DENNEDY, OF DETROIT, MICHIGAN.

MEANS FOR CONTROLLING THE OPERATION OF AIR AND GAS COMPRESSORS.

1,152,400.

Specification of Letters Patent.

Patented Sept. 7, 1915.

Application filed May 23, 1912. Serial No. 699,212.

*To all whom it may concern:*

Be it known that I, JAMES H. DENNEDY, a citizen of the United States, residing at Detroit, county of Wayne, State of Michigan, have invented a certain new and useful Improvement in Means for Controlling the Operation of Air and Gas Compressors, and declare the following to be a full, clear, and exact description of the same, such as will enable others skilled in the art to which it pertains to make and use the same, reference being had to the accompanying drawings, which form a part of this specification.

This invention relates to means for controlling the operation of air and gas compressors, and its object is a simple and efficient method and means by which a compressor may be loaded and unloaded without affecting the system supplied by the compressor.

This system is particularly useful with refrigerating apparatus in which it is desired to operate the compressor by means of a gas engine or an alternating current motor. As is well known, such motive power should be started independently of the load which it is to assume, and when the engine or motor is under action the load must be gradually thrown on to the engine in order that it may not be brought to a standstill. This being the condition under which such apparatus may be employed, it has heretofore been practically impossible to operate an ammonia compressor, for instance, by such motive power because, even if the engine or motor be so connected with the compressor that it may be started without operating the compressor, the engine or motor will become stalled or be unduly strained as soon as the compressor is brought into operative relation therewith by reason of the pressure evolved by each stroke of the piston therein.

In the invention herein disclosed, the gas engine or motor may be directly connected with the compressor shaft, if so desired, by reason of the arrangement of the parts whereby the compressor performs no work during the initial operation thereof and when the engine or motor has attained the required speed the compressor may be made to gradually assume its load. The arrangement of parts by which this general object of the invention may be attained is hereinafter more fully described and claimed and shown in the accompanying drawings, in which—

Figure 1:
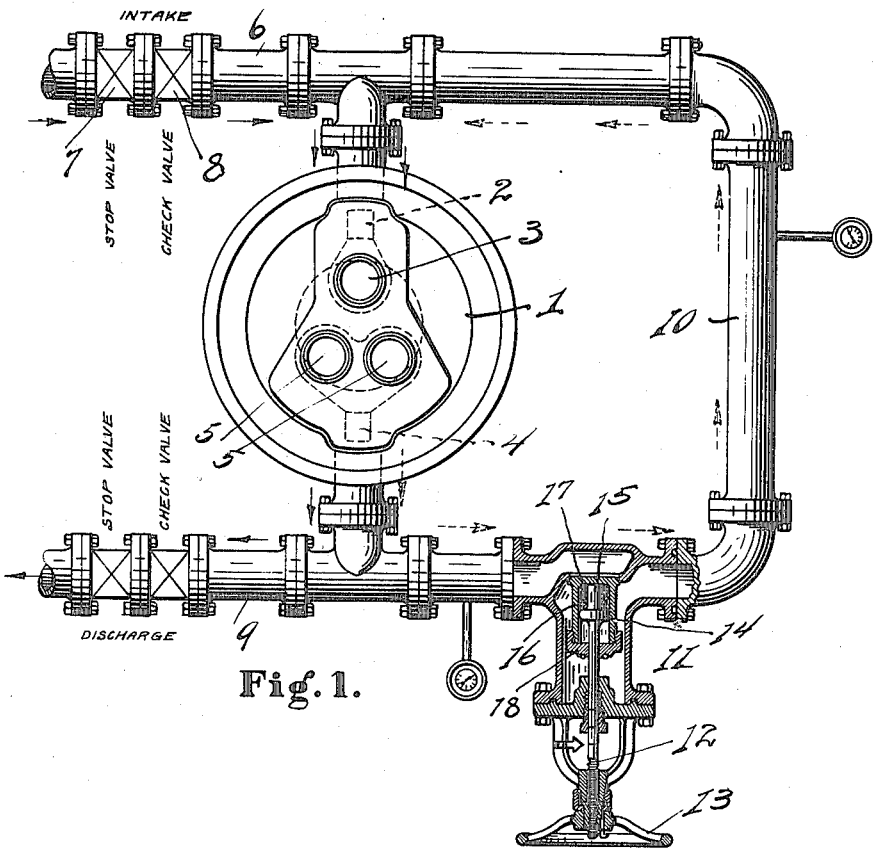
Figure 2:
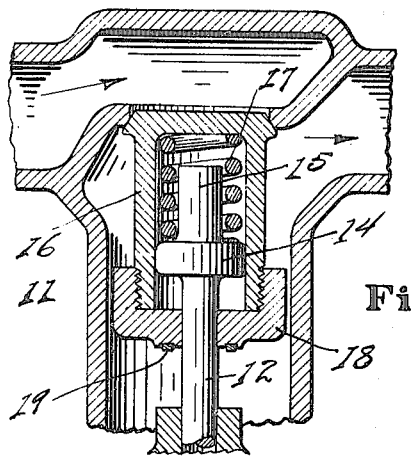
Figure 3:
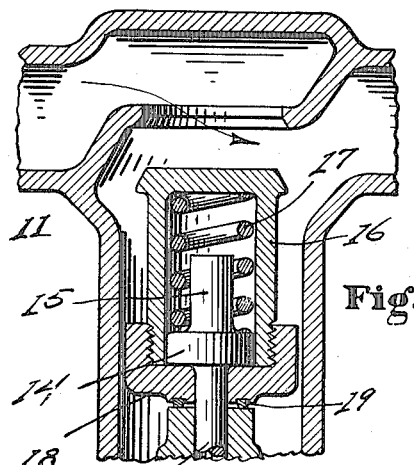

Figure 1 is a plan view of a compressor cylinder showing the arrangement of the piping and valves for loading and unloading the compressor cylinder. Fig. 2 is a detail of a portion of a valve showing the parts in the position assumed when the valve is acting as a check valve. Fig. 3 is a detail showing the valve fully opened.

Similar characters refer to similar parts throughout the drawings and specification.

Fig. 1 is somewhat diagrammatic, the head of the compressor cylinder only being shown, and the method of operating the piston therein being well known in the art. 1 indicates the cylinder provided with an inlet channel 2 which is controlled by a valve located at 3, and also a discharge channel 4 controlled by a pair of valves located at 5, 5 as is usual in this type of compressor. The intake pipe 6 connected with channel 2 is provided with a stop valve 7 and a check valve 8, indicated diagrammatically in the figure, and the discharge piping 9 is provided with like stop and check valves, the check valve in each instance being contiguous to the compressor. As is ordinarily the case, the circuit of gas is from the intake piping through the compressor to the discharge piping as indicated by arrows in full lines in the figure, and in refrigerating machinery the discharge piping is connected with expansion coils, with the expansion end of which the intake piping is also connected, thus establishing the complete circuit, the pressure in the intake piping being comparatively low and that in the discharge piping being comparatively high. With the exception of the stop valves, this is the usual piping employed with compressors.

In addition to the piping described, I employ a pipe line 10 connecting the intake piping with the discharge piping in which line is a manually operatable valve 11 which is normally closed under working conditions, as shown in Fig. 1. If it be desired to unload the compressor the stop valves in both the intake and discharge lines should be closed whereupon the valve 11 may be opened allowing the gas under pressure to flow into the intake line which equalizes the pressure in the piping between the two stop valves.

The check valves in both the intake and discharge lines are of the usual form opening in the direction of the flow of gas as shown by the arrows in full lines in Fig. 1, and closing upon a flow of gas in the direction opposite to that shown by the arrows. To illustrate, if, under normal conditions, the intake line carries gas having a pressure of 15 pounds to the square-inch and the discharge line carries gas having the pressure of 185 pounds per square-inch, then, if the stop valves in said lines be closed and the valve 11 opened to equalize the pressure in the two lines between the stop valves, the pressure in the lines will be in the neighborhood of 160 pounds depending largely upon the difference in length between the high pressure and low pressure portions thereof. It is therefore evident with the pressure 160 pounds, the check valve in both the intake and discharge lines will close under the excessive pressure tending to flow in a direction the reverse of that shown by the arrows. The stop valves may now be opened in both lines as the check valves will maintain the system supplied by the compressor in its normal condition.

With the pressures equalized in the lines between the stop valves, operation of the piston in the compressor cylinder simply transfers gas from the intake side to the discharge side as indicated by dotted arrows in Fig. 1, and, as no work is performed by reason of the gas freely passing through the cylinder without being compressed, a gas engine connected therewith may be started and attain its full speed as readily as if it were not so connected.

The preferable form of valve employed in the auxiliary line 10 is provided with a reciprocatable stem 12, operatable by the hand wheel 13, which is provided near the lower end with an annular enlargement 14 beyond which the end 15 of the stem extends. The enlargement 14 and end 15 of the stem is situated within a chambered valve head 16 within which is a spring 17 surrounding the end 15 of the stem bearing against the enlargement 14 and the bottom of the chamber in the valve head. The valve head is maintained on the stem by means of the cap-nut 18, which is provided with a soft metal ring 19 for reasons hereinafter given.

In the position of the parts shown in Fig. 1, the end of the stem 15 is in engagement with the bottom of the chamber in the valve head, and the valve head is securely held against its seat in which position it acts as a stop valve. By operation of the hand wheel 13, the valve may be fully opened as shown in Fig. 3 in which position of parts the soft ring or washer 19 bears against the mounting of the stem and forms a packing therefor.

As heretofore described, with the valve fully opened, the compressor may be operated without its performing work and, in this condition with the engine running at its normal speed, the load may be gradually brought on to the compressor by gradually closing the valve 11 and as it is brought into contact with its seat as shown in Fig. 2 it will act as a check valve and the pressure on the discharge side of the cylinder is gradually built up while that on the intake side is gradually decreased and, as this pressure is gradually built up as may be indicated by a pressure gage, the valve stem is gradually forced down which compresses the spring 17 to successively greater degrees until the pressure has been built up to the desired degree, whereupon the valve 11 may be completely closed. The system will then operate under normal conditions. By thus gradually building up the pressure the full load is not suddenly thrown on to the compressor and a gas engine or alternating current motor may be employed in the operation thereof by reason of its requirements as to the assumption of the load being fully complied with.

I claim—

1. In a fluid pressure system, in combination a compressor, intake and discharge lines connected therewith, stop and check valves in each of said lines, a by-pass connecting the intake and discharge passages at points between the check valves and the compressor, and a manually operatable valve in said by-pass.

2. In a fluid pressure system, in combination a compressor, intake and discharge pipe lines connected therewith, stop and check valves in each of said lines, a by-pass connecting the intake and discharge passages at points between the check valves and the compressor, a valve for controlling the flow of gas through the by-pass, and means whereby said valve may be gradually closed to build up the pressure on one side of the valve and decrease it on the other side.

3. In a fluid pressure system, in combination a compressor, intake and discharge lines connected therewith, stop valves in each of said lines, a check valve in each line between the stop valves and compressor, a by-pass connecting the intake and discharge passages at points between the check valves and the compressor, and a valve controlling the flow of fluid through the by-pass.

4. The herein described method of loading a fluid compressor consisting in closing the intake and discharge lines, opening a by-pass connecting said lines to equalize the pressure between the valves in the intake and discharge lines, and then gradually closing the by-pass during the operation of the compressor in a manner to build up the pressure on the discharge side of the compressor and decrease the pressure on the intake side thereof between the stop valves.

5. In a fluid pressure system, in combination a compressor, a main circulation system connected therewith, a normally closed auxiliary system connected therewith, means for closing the main circulation system, a valve in said auxiliary system, said valve being arranged to be positively opened or closed, a spring for said valve for holding it on its seat when in its intermediate position, and means whereby the pressure of said spring may be gradually increased and the lift of the valve from its seat gradually decreased.

6. In a fluid pressure system, in combination a compressor, intake and discharge lines connected with the ports thereof, contiguously positioned stop and check valves in each of said lines, a by-pass connecting the intake and discharge passages at points between the check valves and the compressor, and means for controlling the flow of fluid through the by-pass, said means being arranged to positively open or close the by-pass and also including means whereby the by-pass may be gradually closed to a flow of fluid therethrough whereby pressure may be gradually built up on the discharge side of the compressor.

7. In a fluid pressure system having intake and discharge lines wherein a difference of pressure is continuously maintained, the combination with a compressor connected with said lines, of a bypass connecting said intake and discharge lines and the corresponding ports of the compressor, means for positively closing the intake and discharge lines to the compressor, a valve in the bypass adapted to be positively opened and elastically closed, said bypass arrangement forming with the compressor, during the time it is cut off from the intake and discharge lines, an auxiliary system for the circulation of fluid and providing a means whereby the compressor may be gradually loaded to the extent required in maintaining the difference in pressure between the intake and discharge lines of the main system.

In testimony whereof, I, sign this specification in the presence of two witnesses.

JAMES H. DENNEDY.

Witnesses:
RICHARD ALSPAS,
CHARLES E. WISNER.

Copies of this patent may be obtained for five cents each, by addressing the "Commissioner of Patents, Washington, D. C."